(12) United States Patent
Ray

(10) Patent No.: US 8,259,917 B2
(45) Date of Patent: Sep. 4, 2012

(54) SYSTEM AND METHOD FOR GENERATING ONE-WAY SPEECH SIGNAL SAMPLES

(75) Inventor: Amar N. Ray, Shawnee, KS (US)

(73) Assignee: Embarq Holdings Company, LLC, Overland Park, KS (US)

(*) Notice: Subject to any disclaimer, the term of this patent is extended or adjusted under 35 U.S.C. 154(b) by 1163 days.

(21) Appl. No.: 12/111,610

(22) Filed: Apr. 29, 2008

(65) Prior Publication Data

US 2009/0268880 A1    Oct. 29, 2009

(51) Int. Cl.
*H04M 1/64* (2006.01)
*H04M 9/08* (2006.01)
*H04L 12/56* (2006.01)
*E21B 33/13* (2006.01)

(52) U.S. Cl. ............... 379/189; 379/27.01; 379/93.28; 379/177; 379/393; 379/413; 455/417

(58) Field of Classification Search .............. 379/21, 379/22.04, 27.01, 30, 67.1, 93.28, 133, 177, 379/189, 350, 373.01, 377, 393, 399.01, 379/413, 413.03, 442; 455/417
See application file for complete search history.

(56) References Cited

U.S. PATENT DOCUMENTS

| | | | | |
|---|---|---|---|---|
| 3,703,610 A * | 11/1972 | Ebbe et al. | | 379/177 |
| 3,829,618 A * | 8/1974 | Brandon | | 379/133 |
| 4,243,844 A * | 1/1981 | Waldman | | 379/442 |
| 4,283,603 A * | 8/1981 | Cerbone | | 379/189 |
| 5,317,626 A * | 5/1994 | Jaynes et al. | | 379/67.1 |
| 5,390,233 A * | 2/1995 | Jensen et al. | | 455/417 |
| 5,535,265 A * | 7/1996 | Suwandhaputra | | 379/93.28 |
| 5,818,905 A * | 10/1998 | Ohno | | 379/30 |
| 5,920,624 A * | 7/1999 | Davis | | 379/373.01 |
| 6,157,713 A * | 12/2000 | Wu | | 379/393 |
| 6,292,540 B1 * | 9/2001 | Chea et al. | | 379/21 |
| 6,427,011 B1 * | 7/2002 | Sacca | | 379/399.01 |
| 6,504,906 B1 * | 1/2003 | Kiko | | 379/27.01 |
| 6,584,195 B1 * | 6/2003 | Yamanishi et al. | | 379/377 |
| 6,731,750 B1 * | 5/2004 | Bareis | | 379/399.01 |
| 6,741,675 B2 * | 5/2004 | Chea et al. | | 379/22.04 |
| 7,023,987 B1 * | 4/2006 | Prentice | | 379/413.03 |
| 7,702,095 B2 * | 4/2010 | Binder et al. | | 379/413 |
| 2007/0121906 A1 * | 5/2007 | Kim | | 379/350 |
| 2009/0268880 A1 * | 10/2009 | Ray | | 379/67.1 |

* cited by examiner

*Primary Examiner* — Gerald Gauthier

(74) *Attorney, Agent, or Firm* — Patton Boggs, LLP

(57) ABSTRACT

A system and method for generating one-way speech signal samples may include, in a telecommunications network, establishing a call connection between a far-end telephone and a near-end telephone. A resistance component may be selectively configured in parallel with the far-end telephone, where the resistance component has a value representative of resistance produced by the far-end telephone being off hook. A speech signal being communicated from the near-end telephone may be recorded.

14 Claims, 5 Drawing Sheets

SYSTEM AND METHOD FOR GENERATING ONE-WAY SPEECH SIGNAL SAMPLES

BACKGROUND OF THE INVENTION

One-way speech signal samples are used in the area of telecommunications and acoustic science. In fact, recordings of one-way speech signal samples are in high demand to check and test advanced digital networks. A problem with creating one-way speech signal samples over a telecommunications system is the ability to create one-way speech signal samples with low signal-to-noise (SNR) ratios as feedback noise in a telecommunications system is often too high to produce quality one-way speech signal samples with a low signal-to-noise ratio. And, as amplification is typically used to increase speech signal amplitude, noise during silent intervals (i.e., gaps in speech) is also amplified, thereby degrading quality of one-way speech signal samples.

SUMMARY OF THE INVENTION

To overcome the problem of creating one-way speech signal samples, the principles of the present invention provides for a system and method of generating one-way speech signal samples with low feedback noise so as to provide high signal-to-noise ratios. A test setup may include utilizing a resistance component, such as a resistor, at a far-end telephone that simulates an off-hook resistance of the far-end telephone, thereby providing very low feedback noise from the far-end telephone. A telephone with a hands-free mode (e.g., microphone or headset configured telephone) may be used for a near-end telephone in recording a one-way speech signal sample along a telecommunications network, such as within a central office, when a person at or near the near-end telephone is having an actual conversation on another telephone, thereby providing a realistic speech conversation.

One embodiment of a method for generating one-way speech signal samples may include, in a telecommunications network, establishing a call connection between a far-end telephone and a near-end telephone. A resistance component may be selectively configured in parallel with the far-end telephone, where the resistance component has a value representative of resistance produced by the far-end telephone being off hook. A speech signal being communicated from the near-end telephone may be recorded.

One embodiment of a system for recording one-way speech signals samples in a telecommunications networks may include a near-end telephone and a far-end telephone. The telephones may be utilized to form a communications path there between over a communications network. A resistance component may be selectively configurable to be in parallel with the far-end telephone. A recording device may be configured along the communications path in the communications network to record a one-way speech signal sample from the near-end telephone.

DETAILED DESCRIPTION OF THE DRAWINGS

Figure 1:
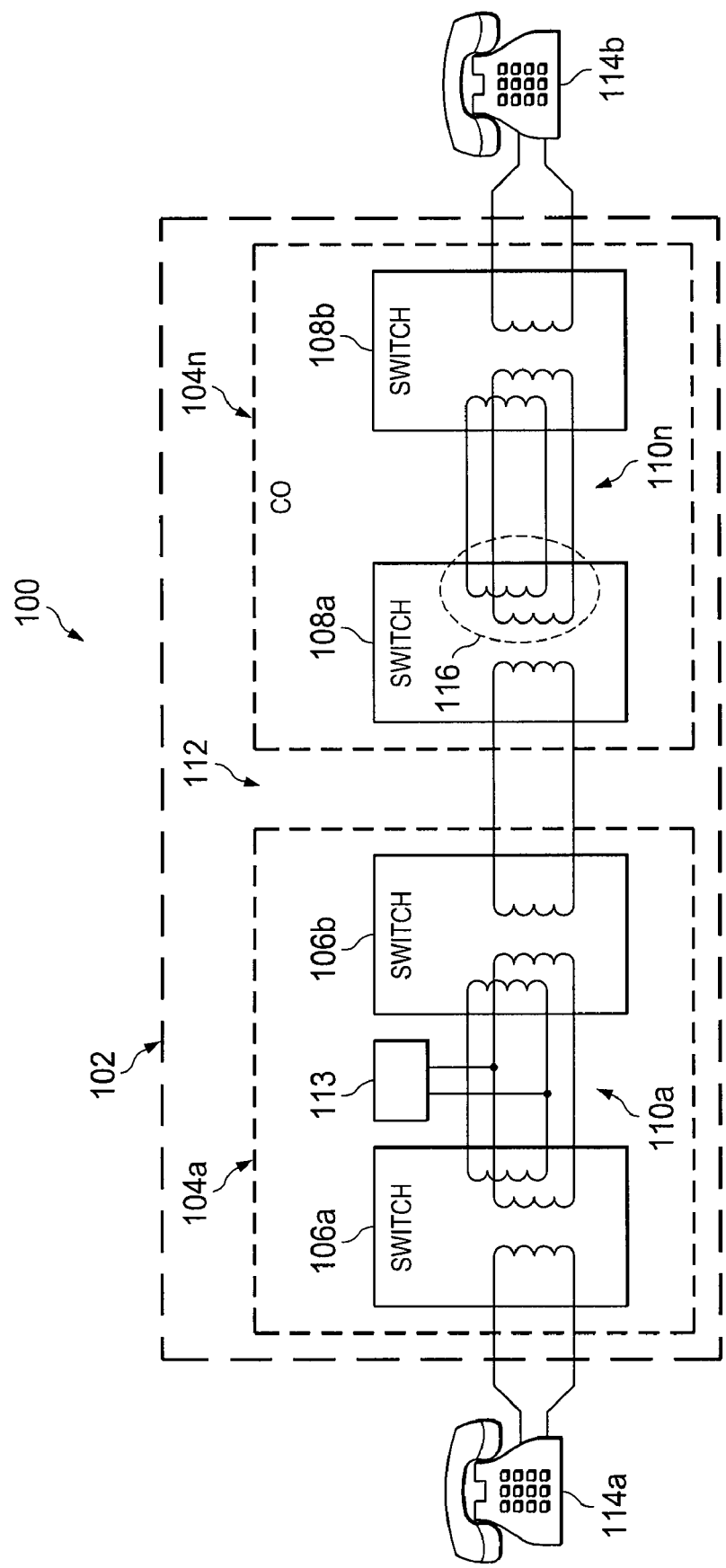
FIG. 1 is a block diagram of an exemplary communications system in which the principals of the present invention may be applied.

With regard to FIG. 1, a telecommunications network system 100 may include a telecommunications network 102. The telecommunications network 102 may include central offices 104a and 104n (collectively 104) operated by one or more telecommunications service providers. The telecommunications service providers may be traditional telecommunication service providers (e.g., local telephone companies) and non-traditional telecommunications service providers (e.g., cable, Internet, and satellite service providers). The local offices 104a and 104n may include switches 106a, 106b and 108a, 108b, respectively. Switches 106a and 106b may be connected via trunk 110a and switches 108a and 108b may be in communication via trunk 110n. In addition, central offices 104a and 104n may be in communication via a trunk 112.

Two telephones 114a and 114b may be utilized to communicate with one another via the telecommunications network 102. As understood in the art, background noise may be created when analog components in the telecommunications network 102 are utilized to communicate signals. In addition, feedback noise is created when a call passes through a switch, such as switch 108a, and is most often caused by a switch serving a far-end telephone.

If a one-way voice signal is to be recorded by a recorder 113 at the central office 104a during a call placed from near-end telephone 114a, to far-end telephone 114b, feedback noise is created at switch 108a due to transformer 116. The recorder 113 may be a digital recorder configured to store speech in a memory unit, digital tape, or any other storage mechanism. In one embodiment, the recorder 113 may receive data packets and extract and store speech signals contained in the data packets. As understood in the art, feedback noise creates a low signal-to-noise ratio, which is problematic for acoustic sciences in testing digital communications systems. So as to avoid feedback noise created in the telecommunications network 102, the principals of the present invention may provide for a test configuration between the far-end telephone 114b and switch 108b of the central office 104n to simulate the far-end telephone 114b being off-hook.

For the purposes of this description, a "telephone" is defined as any telephone or communications device capable of enabling a user to place voice calls with another party. The telephones may include traditional telephones, cordless telephones, voice over Internet Protocol (VoIP) telephones, or any other communications device, as understood in the art. A telephone generally has two resistance levels, an on-hook resistance level that is high, typically in the mega-Ohms, and an off-hook resistance level that is lower, typically between approximately 200 Ohms and approximately 300 Ohms. It should be understood that these resistances are typical, but other resistance levels may be used for different types of telephones (e.g., conventional telephone versus voice over Internet Protocol (VoIP) telephone).

Figure 2A:
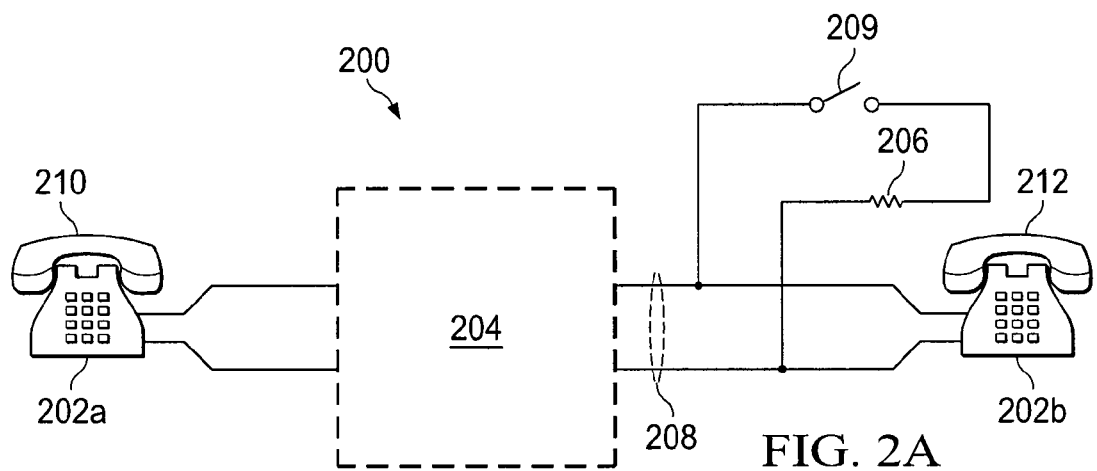
FIG. 2A is an illustration of an exemplary first configuration of a test configuration for recording a one-way speech signal sample.

With regard to FIGS. 2A-2D, steps for creating one-way speech signal samples are depicted. As shown in FIG. 2A, the communications network 200 includes a near-end telephone 202a and a far-end telephone 202b, which communicate via communications network 204. A resistance component 206 may be connected to a two-wire communications path 208 so as to be in parallel with the far-end telephone 202b. A switch 210, which may be a physical or electronic switch, may be configured to enable the resistive component 206 to be engaged and disengaged. The resistance component 206 may be a resistor or any other resistance component, as understood in the art. In one embodiment, the resistance component 206 may be a resistor carrying a resistance value of between approximately 200 Ohms and approximately 300 Ohms. It should be understood that the configuration of the resistance component 206 may include one or more resistance components to provide any resistance value that simulates the far-end telephone 202b being off-hook.

Figure 2B:
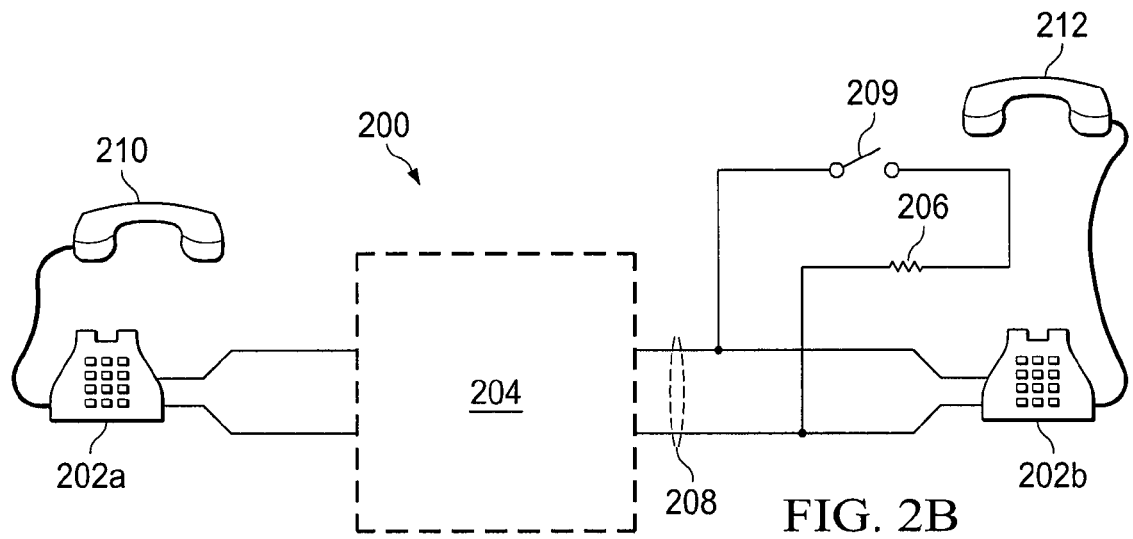
FIG. 2B is an illustration of an exemplary second configuration of the test configuration of FIG. 2A for recording the one-way speech signal sample.

To initiate recording of a one-way speech signal sample, a user may transition the near-end telephone 202a from an on-hook to an off-hook state by picking up handset 210 and dialing a telephone number for the far-end telephone 202b. As shown, the far-end telephone 202b has its handset 212 on-hook and the switch 209 is open so that the resistance component 206 does not affect cooperation of the far-end telephone 202b. In FIG. 2B, the far-end telephone 202b may have its handset 212 taken off-hook so as to form a communication connection with the near-end telephone 202a. The switch 209 remains open until the connection is complete.

Figure 2C:
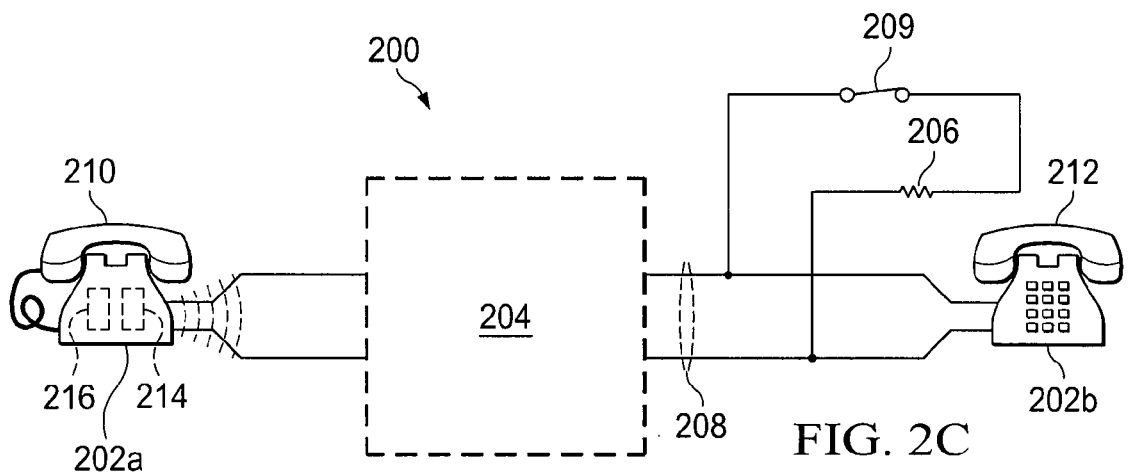
FIG. 2C is an illustration of an exemplary third configuration of the test configuration of FIG. 2A for recording the one-way speech signal sample.

As shown in FIG. 2C, after the connection between the near-end telephone 202a and far-end telephone 202b, the switch 209 may be closed, thereby engaging the resistance component 206 with the two-wire telephone line 208. In addition, the handset 212 may be placed on-hook on the telephone 202b. Furthermore, in this embodiment, the near-end telephone 202a may be placed into a hands-free mode, whereby a speaker 214 and microphone 216 are utilized to enable the user to communicate over the communications network 204. The handset 210 may be placed on-hook on the near-end telephone 202a while in the hands-free mode. In an alternative embodiment, a wireless headset may be utilized to communicate via the near-end telephone 202a rather than using the speaker 214 and microphone 216. The resistance component 206 may be set to a value that simulates an off-hook resistance value of the far-end telephone 202b, thereby maintaining the connection with the near-end telephone 202a while providing minimal feedback noise so that a one-way speech signal sample may have a higher signal-to-noise ratio than if the hand-set 212 were off-hook from the far-end telephone 202b. Although the near-end telephone is shown being placed into a hands-free mode, it should be understood that such a mode is for convenience of a user when recording the one-way speech signal sample and could be performed using the hand-set 212.

Figure 2D:
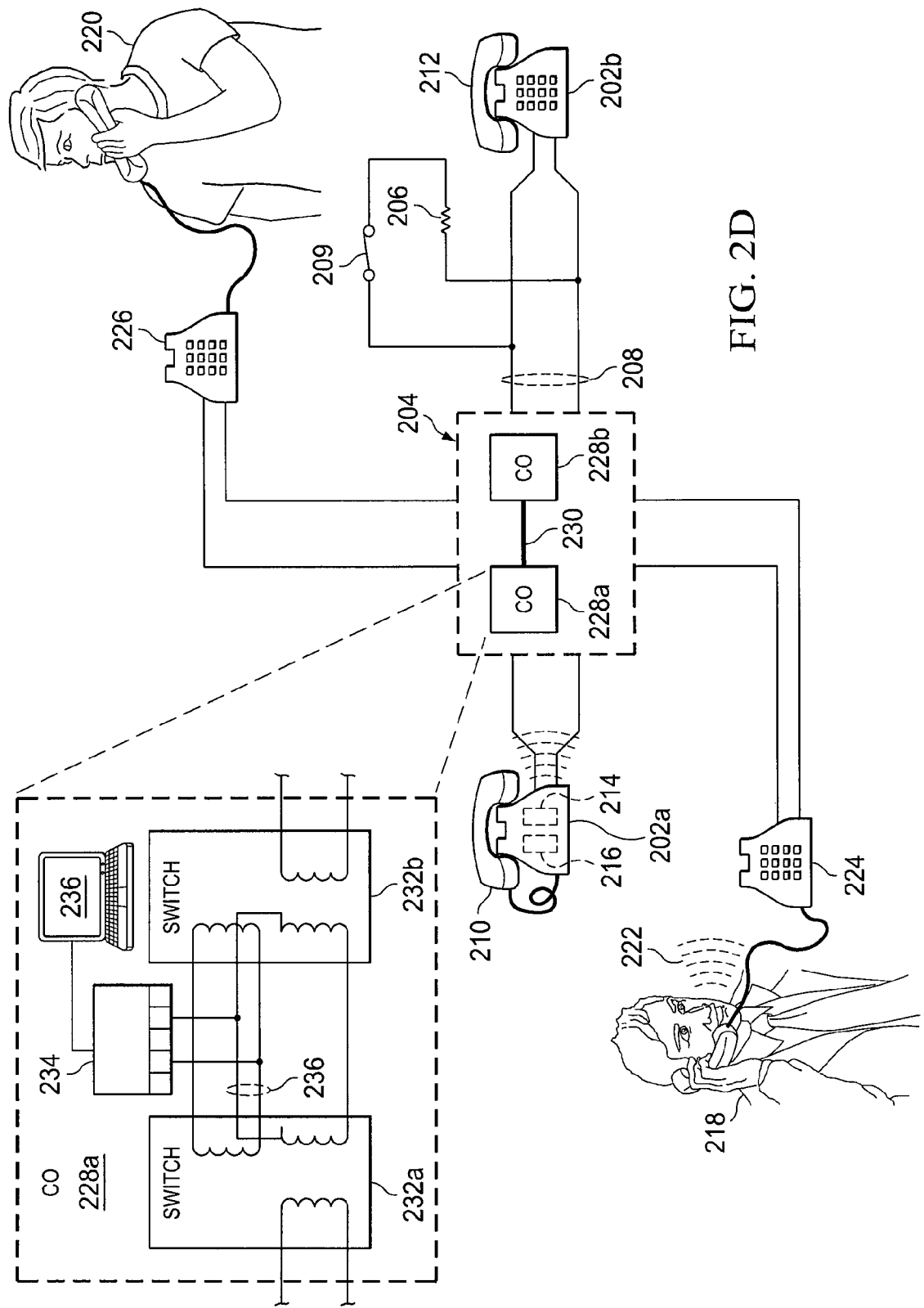
FIG. 2D is an illustration of an exemplary fourth configuration of the test configuration of FIG. 2A for recording the one-way speech signal sample.

As shown in FIG. 2D, to generate an actual and realistic one-way speech signal sample, a user at the near-end telephone 202a who calls another party either at the far-end telephone 202b or elsewhere may have a conversation near the near-end telephone 202a, such that the near-end telephone 202a is within typical range (e.g., a few feet) of the user to receive speech signals 222. The user 218 may call the other party 220 by using telephone 224 and calling telephone 226, which forms a separate, unrelated connection via the communications network 204. It should be understood that the communication path between telephones 224 and 226 may be unrelated to this connection path between telephones 202a and 202b, and that the reason for establishing a call between user 218 and other party 220 is to provide an actual conversation between two people so that the one-way speech signal sample recorded at a switch at a central office handling the call from the near-end telephone 202a or elsewhere is as realistic as possible. It should be understood that the call may be recorded by an external recorder from the switch or recorded by the switch itself into memory or storage device. To reiterate, the user 218 is to be within normal hands-free range of the near-end telephone 202a if using speaker mode or utilizing a wired or wireless headset (not shown) that communicates with the near-end telephone 202a while the user 218 is speaking on a telephone call with the other party 220 using telephones 224 and 226, respectively.

As further shown, central office 228a that operates to provide access to the telecommunications network 204 for the near-end telephone 202a may be in communication with central office 228b via trunk 230. Within the central office 228a, a first switch 232a may be in communication with a second switch 232b. A recorder 234 may be connected to a pair of communications lines 236 to capture the speech signals 222 being communicated from the near-end telephone 202a to the far-end telephone 202b, which is being simulated as being off-hooked by resistance component 206, as previously described herein. A computing device 236 may be in communication with the recorder 234 to provide for the one-way speech signal sample to be stored and communicated or otherwise accessed for use in other applications.

Figure 3:
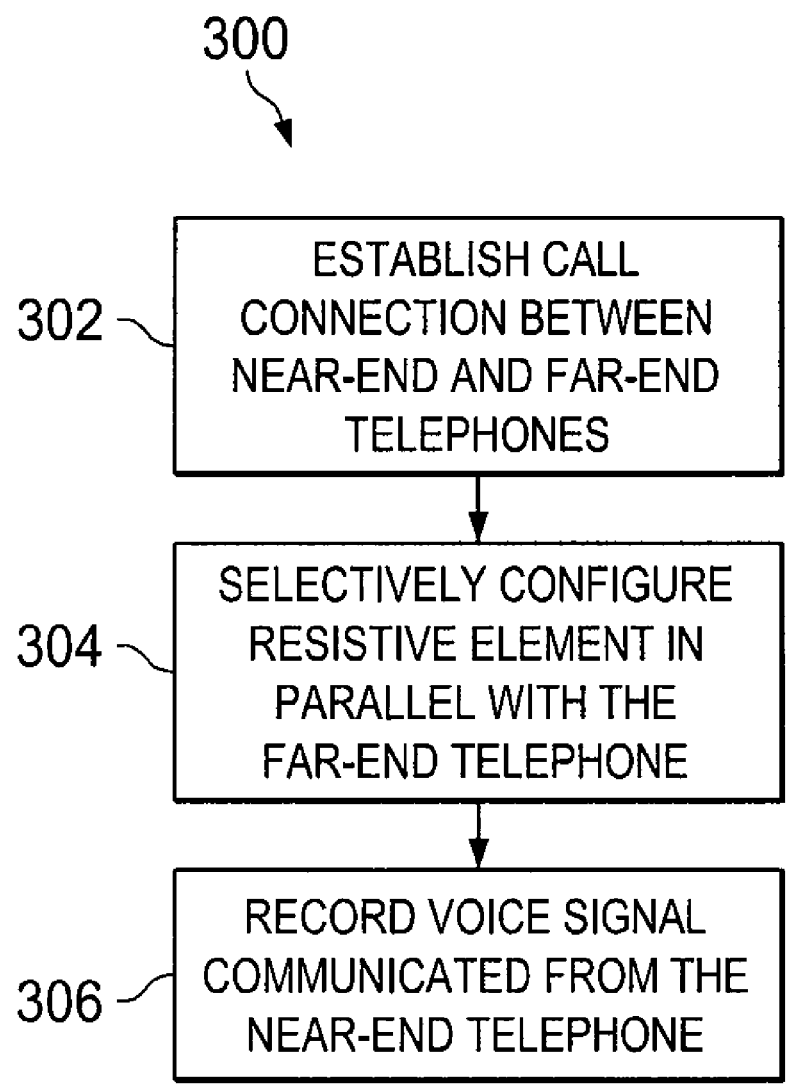
FIG. 3 is a flow chart of an exemplary process for recording one-way speech signal samples.

With regard to FIG. 3, a process 300 provides for generating one-way speech signal samples. The process 300 starts at step 302, where a call connection between near-end and far-end telephones is established. At step 304, a resistance component may be selectively configured in parallel with the far-end telephone. In one embodiment, the resistance component may be switched into a communication path between the near-end and far-end telephones using a physical or electronic switch, as understood in the art. A resistance component may include one or more resistors or any other electrical components that simulate or otherwise model an off-hook condition of the far-end telephone, thereby enabling the far-end telephone to be placed on-hook to minimize feedback noise during recording of a one-way speech signal. At step 306, a speech signal being communicated from the near-end telephone may be recorded. To provide for a realistic communication, a user at the near-end telephone may be on a different telephone call with another party and be in close proximity with the near-end telephone while the near-end telephone is in a hands-free mode so that the near-end telephone may receive the speech signals from the user.

Figure 4:
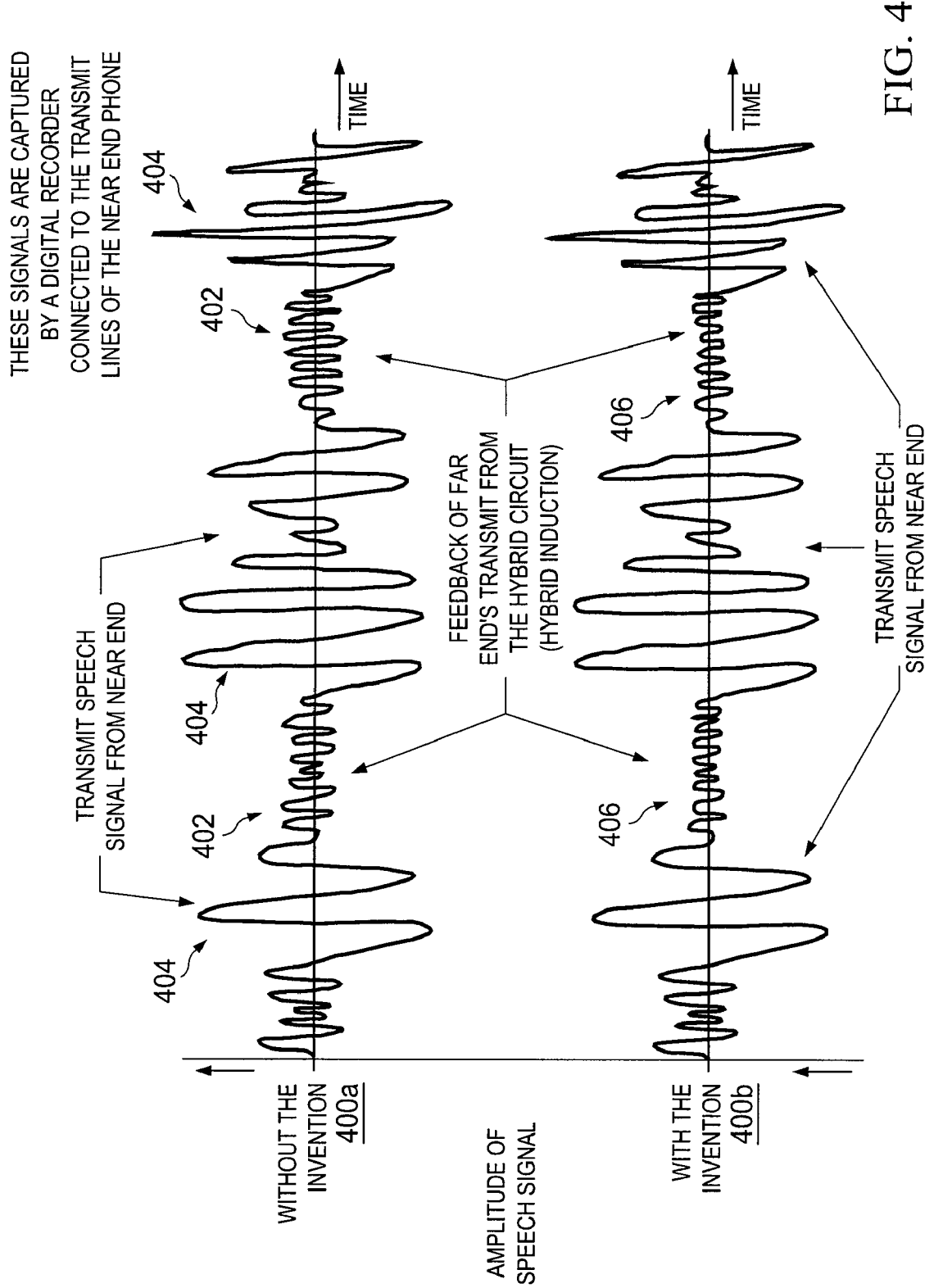
FIG. 4 is a graph showing two exemplary one-way speech signal samples, one without and one with the test configuration of FIG. 2A.

With regard to FIG. 4, two speech signals 400a and 400b show how feedback noise is affected without and with inclusion of a resistive element, respectively. As shown in speech signal 400a, feedback noise signals 402 are depicted between speech signals 404. It should be understood, however, that the feedback noise 402 is in the speech signal 400a, but has a lesser residual effect due to the signal-to-noise ratio being higher when speech is being communicated. As shown in the speech signal 400b, the feedback noise 406 is significantly lower than the feedback noise 402 due to the resistive element simulating an off-hook condition of a far-end telephone. The signal-to-noise ratio of the speech signal 400b is, therefore, higher than the signal-to-noise ratio of the speech signal 400a.

Although the principles of the present invention have been described in terms of the foregoing embodiments, this description has been provided by way of explanation only, and is not intended to be construed as a limitation of the invention. Those skilled in the art will recognize modifications of the present invention that might accommodate recording one-way speech signal samples.

I claim:

1. A method for generating one-way speech signal samples, comprising:
    in a telecommunications network:
        establishing a call connection between a far-end telephone and a near-end telephone;
        selectively configuring a resistance component in parallel with the far-end telephone, the resistance component having a value representative of resistance produced by the far-end telephone being off-hook; and
        recording a speech signal being communicated from the near-end telephone.

2. The method according to claim 1, wherein configuring the resistance component includes connecting a resistor having a value between approximately 200 Ohms and approximately 300 Ohms.

3. The method according to claim 2, wherein connecting includes switching a switch from an open to a closed position to electrically connect the resistance component.

4. The method according to claim 3, wherein switching the switch is performed after the call connection has been established.

5. The method according to claim 1, wherein establishing a call connection includes establishing a call connection with the near-end telephone, the near-end telephone being configured with a microphone for hands-free communications.

6. The method according to claim 1, further comprising, after selectively configuring the resistance component, configuring the far-end telephone in an on-hook configuration, and wherein recording the speech signal is performed after configuring the far-end telephone in the on-hook configuration.

7. The method according to claim 1, wherein recording the speech signal is performed at a communications switch in the telecommunications network.

8. A system for recording one-way speech signals samples in a telecommunications networks, system comprising:
    a near-end telephone;
    a far-end telephone, the near-end and the far-end telephones being utilized to form a communications path there between over a communications network;
    a resistance component selectively configurable to be in parallel with said far-end telephone; and
    a recording device configured along the communications path in the communications network to record a one-way speech signal sample from the near-end telephone.

9. The system according to claim 8, wherein said resistance component is positioned at the far-end telephone.

10. The system according to claim 8, wherein said resistance component includes a resistor and switch to configure the resistor to be selectively switched in parallel with said far-end telephone.

11. The system according to claim 8, wherein said resistance component has a resistance within a range between approximately 200 Ohms and approximately 300 Ohms.

12. The system according to claim 8, further comprising a network switch, said recording device being connected to the communications path at said network switch.

13. The system according to claim 8, wherein said near-end telephone is configured to operate in a hands-free mode.

14. The system according to claim 8, wherein said recording device is configured to record the one-way speech signal sample digitally.

* * * * *